UNITED STATES PATENT OFFICE.

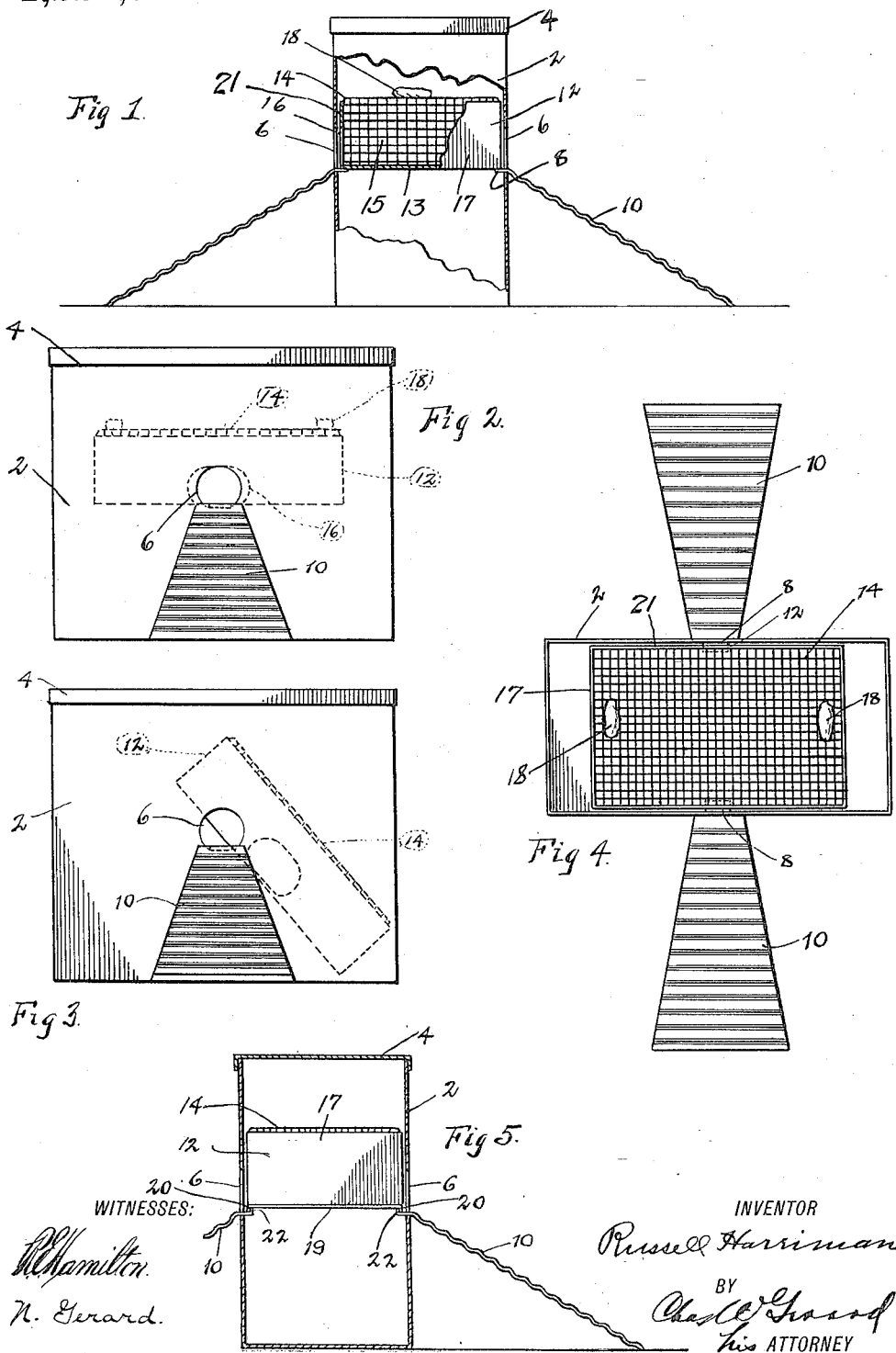

RUSSELL HARRIMAN, OF KANSAS CITY, MISSOURI.

ANIMAL-TRAP.

1,220,743.  Specification of Letters Patent.  Patented Mar. 27, 1917.

Application filed September 19, 1914, Serial No. 862,426.  Renewed February 19, 1917.  Serial No. 149,655.

*To all whom it may concern:*

Be it known that I, RUSSELL HARRIMAN, a citizen of the United States, residing at Kansas City, in the county of Jackson and State of Missouri, have invented certain new and useful Improvements in Animal-Traps; and I do declare the following to be a full, clear, and exact description of the invention, such as will enable others skilled in the art to which it appertains to make and use the same.

The present invention relates to animal traps and the object is to provide an effective device of this character which will be of simple and durable, as well as sanitary, construction. For this purpose a trap has been devised which is made up of an exterior receptacle having suitably mounted therein a tilting cage provided with one or more openings adapted to move into or out of register with similar openings in the exterior receptacle according to the position of the cage.

With the above stated general object in view, the invention will now be described in connection with the accompanying drawing illustrating means for carrying the invention into practice, after which those features and combinations deemed to be novel will be severally specified in the appended claims.

In the drawing—

Figure 1 is an end elevation of one form of the device, partly broken away;

Fig. 2 is a side elevation of the same, showing the cage in dotted lines;

Fig. 3 is a similar view with dotted lines representing another position of the cage;

Fig. 4 is a plan view of the device with the cover removed; and

Fig. 5 is a vertical sectional view (partly broken away and showing the tilting cage in end elevation) illustrating a modified form.

Referring to the drawing, an oblong, box-like receptacle 2 constitutes the main portion of the device, being provided with a removable cover 4. At the center of each side of the receptacle is provided an opening 6, the lower edges of which openings are straight to adapt them for supporting the shouldered extensions 8 of a pair of inclined members 10 designed to constitute approaches to said openings. These approach members are preferably of tapered form, and it is preferred to corrugate them, as illustrated, to afford a surer tread surface.

Mounted on the inwardly projecting extensions 8 is a tilting cage, which comprises an oblong box-like member 12 into which fits a removable screen 14 having the depending end portions 15 fitting against the inner faces of the end walls 17 of the member 12. The member 12 has the bottom portion 13 (see Fig. 1) and side walls 21, the latter being provided with oval openings 16 designed to register with the openings 6 of the outer receptacle 2 when the cage is in horizontal position. The openings 16 are of oval form so that the sets of openings may be maintained in register while permitting more or less adjustment of the cage on its supports for adapting it to be rocked by a greater or lesser tilting force at one end or the other of the cage. The trap is baited by placing pieces of the bait material 18 upon the screen 14 at opposite ends of the cage.

In the modified form illustrated in Fig. 5 the cage is supported upon a cross-strip 19 which is provided with down-turned ends 20 for engaging up-turned portions 22 on the extensions 8, and thus serving to hold the parts securely together. In case it should be desired to set the trap in the ground with the trap openings level with the ground surface, the approach members 10 would be dispensed with, and a single cross-strip similar to strip 19 used to support the cage from the openings 6 of the outer receptacle 2.

It will now be understood that the animal for which the trap is set will enter the trap from one or the other of the approaches 10 and through the openings 6 and 16 into the cage. The arrangement of the two sets of openings makes it possible for the animal to pass entirely through the trap without any cause for alarm and thus tends to give the animal more confidence. But as soon as the creature wanders toward one end or the other of the cage, the latter of course rocks and slides into the position illustrated in Fig. 3, thus trapping the animal by closing the openings 16. The approach members 10 can now be removed, allowing the cage to fall to the bottom of the receptacle 2, and water poured in to drown the victim. By this means, the animal is caught and killed in a humane manner, and also without injury to its skin or fur, which is a matter of some importance in certain industries, as in fur farming. Another feature of importance is the fact that, as soon as the animal is caught, it is concealed from view from any of its companions, so that the latter are left in ignorance as to the fatal character of the device and will be practically as likely to fall victims later as the one first caught. Moreover, it is obvious that one supply of bait will last indefinitely, since the same is so placed as not to be consumed by the creatures entering the trap. Again, the simplicity of the device renders it inexpensive and easy to keep clean and in working order with little attention and without any likelihood of injury to one's person; and in disposing of a victim once caught it is obviously unnecessary to come in contact therewith. The trap may be made of any suitable material, such as wood, tin, zinc, or galvanized material, but it is preferably constructed of metal in order to make the same durable and entirely sanitary.

While the foregoing represents two forms of embodiment of the invention which have been found to be practical, the right is reserved to such changes and modifications as may fairly fall within the scope of the appended claims.

Claims:

1. In an animal trap, the combination of a receptacle provided with openings on opposite sides thereof, exterior members leading to said openings and provided with supporting extensions projecting within the openings, and a tilting cage within the receptacle supported by said extensions, said cage being provided with openings registering in one position of the cage with the receptacle openings and passing out of register therewith on tilting of the cage.

2. In an animal trap, the combination of a closed receptacle provided with a side opening, a support adjacent the lower edge of said opening, and a member movably and slidably mounted within the receptacle upon said support and acting as a door for closing and unclosing said opening, said member being adapted to rock and slide upon said support under the weight of the animal and come to rest with one end at the bottom of the receptacle and its opposite end closing said opening.

3. In an animal trap, the combination of a receptacle provided with an opening in each of its opposite sides, a support in line with the lower edges of said openings, and a cage within said receptacle tiltably and slidably mounted upon said support and provided with openings only on opposite sides in position to register with said receptacle openings in the horizontal position of the cage, said cage being adapted to rock and slide upon said support under the weight of the animal and thereby bring said openings out of register and close the cage.

4. In an animal trap, the combination of a receptacle provided with an opening in each of its opposite sides, a support in line with the lower edges of said openings, and a cage tiltably mounted upon said support, said cage comprising an inner receptacle provided with a removable screen cover and having openings only on opposite sides in position to register with said first named openings in the horizontal position of the cage, said cage being adapted to rock upon said support under the weight of the animal and thereby bring said openings out of register and close the cage.

In testimony whereof I affix my signature in the presence of two witnesses.

RUSSELL HARRIMAN.

Witnesses:
C. W. GERARD,
CONGER R. SMITH.

Copies of this patent may be obtained for five cents each, by addressing the "Commissioner of Patents, Washington, D. C."